United States Patent
Yamai et al.

(10) Patent No.: US 9,996,169 B2
(45) Date of Patent: Jun. 12, 2018

(54) CAPACITIVE JOYSTICK DEVICE

(71) Applicant: PIXART IMAGING INC., Hsin-Chu County (TW)

(72) Inventors: Masatoshi Yamai, Hsin-Chu County (TW); Chi-Chieh Liao, Hsin-Chu County (TW); Hung-Yu Lai, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 279 days.

(21) Appl. No.: 14/725,211

(22) Filed: May 29, 2015

(65) Prior Publication Data

US 2016/0004333 A1    Jan. 7, 2016

(30) Foreign Application Priority Data

Jul. 4, 2014    (TW) .............................. 103123238 A
Nov. 11, 2014  (TW) .............................. 103139176 A

(51) Int. Cl.
*G06F 3/0338*    (2013.01)

(52) U.S. Cl.
CPC .................................. *G06F 3/0338* (2013.01)

(58) Field of Classification Search
None
See application file for complete search history.

(56) References Cited

U.S. PATENT DOCUMENTS

| 4,769,517 A * | 9/1988 | Swinney ............ G05G 9/04796 200/6 A |
| 6,087,925 A * | 7/2000 | DeVolpi ................. H01C 10/06 338/47 |
| 6,184,865 B1 * | 2/2001 | Zimmerman .......... G05G 9/047 345/160 |
| 2002/0157212 A1 * | 10/2002 | Velinsky ................. E02F 3/905 15/414 |
| 2006/0279535 A1 * | 12/2006 | Chang ................... G06F 3/0205 345/156 |
| 2011/0025651 A1 * | 2/2011 | Buil ..................... G06F 3/03545 345/179 |
| 2013/0050075 A1 | 2/2013 | Lin et al. |

FOREIGN PATENT DOCUMENTS

| CN | 202257472 U | 5/2012 |
| JP | H08286833 A | 11/1996 |
| TW | M430646 U1 | 6/2012 |

* cited by examiner

*Primary Examiner* — Christopher Kohlman
(74) *Attorney, Agent, or Firm* — Hauptman Ham, LLP

(57) ABSTRACT

There is provided a capacitive joystick device including a substrate, a fixed plate, a movable member, a plurality of elastic elements, a cone and an operation stick. The substrate includes a ground region and a capacitance sensing region. The fixed plate includes a first opening. The movable member includes a second opening. The elastic elements are symmetrically disposed between the fixed plate and the movable member. The cone is disposed between the movable member and the substrate, and includes a base, a vertex and a lateral surface. The base presses against the movable member. The vertex is disposed on the ground region of the substrate. The lateral surface is aligned with the capacitance sensing region of the substrate. The operation stick extends from the base of the cone and passes through the first opening and the second opening.

16 Claims, 8 Drawing Sheets

CAPACITIVE JOYSTICK DEVICE

RELATED APPLICATIONS

The present application is based on and claims priority to Taiwanese Application Number 103123238, filed Jul. 4, 2014 and Taiwanese Application Number 103139176, filed Nov. 11, 2014, the disclosures of which are hereby incorporated by reference herein in their entirety.

BACKGROUND

1. Field of the Disclosure

This disclosure generally relates to a joystick device and, more particularly, to a capacitive joystick device.

2. Description of the Related Art

The traditional joystick device is designed by adopting the variable resistor but has the drawback that the variable resistor has time-varying characteristics such that a calibration is necessary. In addition, the stick of traditional mechanical joystick devices has a significant height such that the mechanical joystick devices are not suitable to a portable device or a wearable device.

SUMMARY

Accordingly, the present disclosure further provides a capacitive joystick device which has a small size and does not need calibration to be adaptable to various portable devices or wearable devices.

The present disclosure provides a capacitive joystick device including a substrate, a fixed plate, a movable member, a plurality of elastic elements, a cone and an operation stick. The substrate has a ground region and a capacitance sensing region. The fixed plate has a first opening. The movable member has a second opening. The elastic elements are symmetrically disposed between the fixed plate and the movable member to press against the fixed plate and the movable member. The cone is disposed between the movable member and the substrate, and includes a base, a vertex and a lateral surface. The base presses against the movable member. The vertex is disposed at the ground region of the substrate. The lateral surface is aligned with the capacitance sensing region of the substrate. The operation stick extends from the base of the cone and passes through the first opening and the second opening.

The present disclosure further provides a capacitive joystick device including a substrate, a fixed plate, a cone, an elastic element and an operation stick. The substrate has a ground region and a capacitance sensing region. The fixed plate has a first opening and is separated from the substrate by a relative distance. The cone includes a base, a vertex and a lateral surface. The vertex is disposed at the ground region of the substrate. The lateral surface is aligned with the capacitance sensing region of the substrate. The elastic element is disposed between the fixed plate and the base of the cone. The operation stick extends from the base of the cone and movable passes through the elastic element and the first opening of the fixed plate.

The present disclosure further provides a capacitive joystick device including a substrate, a fixed plate, a cone, at least one elastic element and an operation stick. The substrate has a ground region and a capacitance sensing region. The fixed plate has a first opening and a side wall, wherein the side wall extends toward and is combined with the substrate and is configured to maintain a relative distance between the substrate and the fixed plate. The cone includes a base, a vertex and a lateral surface. The vertex is disposed at the ground region of the substrate. The lateral surface is aligned with the capacitance sensing region of the substrate. The at least one elastic element is disposed between the fixed plate and the base of the cone. The operation stick extends from the base of the cone and passes through the first opening of the fixed plate, wherein the at least one elastic element is configured to provide a restoring force to the base of the cone when the operation stick receives an external force.

In one embodiment, the at least one elastic element directly presses against the base of the cone, or indirectly presses against the base of the cone via a movable member.

The joystick device provided in the present disclosure may eliminate the calibration problem as well as have the benefit of outputting different strengths in a same direction. Meanwhile, as a force restoring unit is incorporated, the stick automatically recovers to an original position when the external force is removed. Accordingly, a large operating space is not necessary for the device main body.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
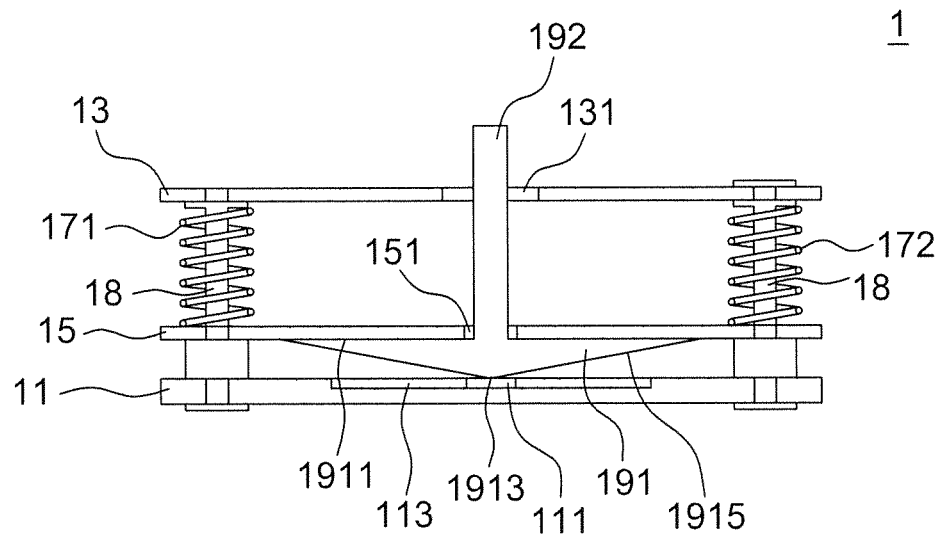
FIG. 1 is across-sectional view of a capacitive joystick device according to one embodiment of the present disclosure.

Referring to FIG. 1, it is a cross-sectional view of a capacitive joystick device 1 according to one embodiment of the present disclosure. The capacitive joystick device 1 realizes a capacitive joystick device having a restoring force utilizing the detection principle of the mutual capacitance or the self capacitance in conjunction with the elastic element configured as the force restoring element.

The capacitive joystick device 1 includes a substrate 11, a fixed plate 13, a movable member 15, a plurality of elastic elements (e.g. only two elastic elements 171 and 172 shown in the cross-sectional view of FIG. 1, but an actual number is not limited thereto), a cone 191 and an operation stick 192, wherein said fixed plate 13 is non-movable with respect to the substrate 11 and said movable member 15 is movable with respect to the substrate 11.

Figure 4:
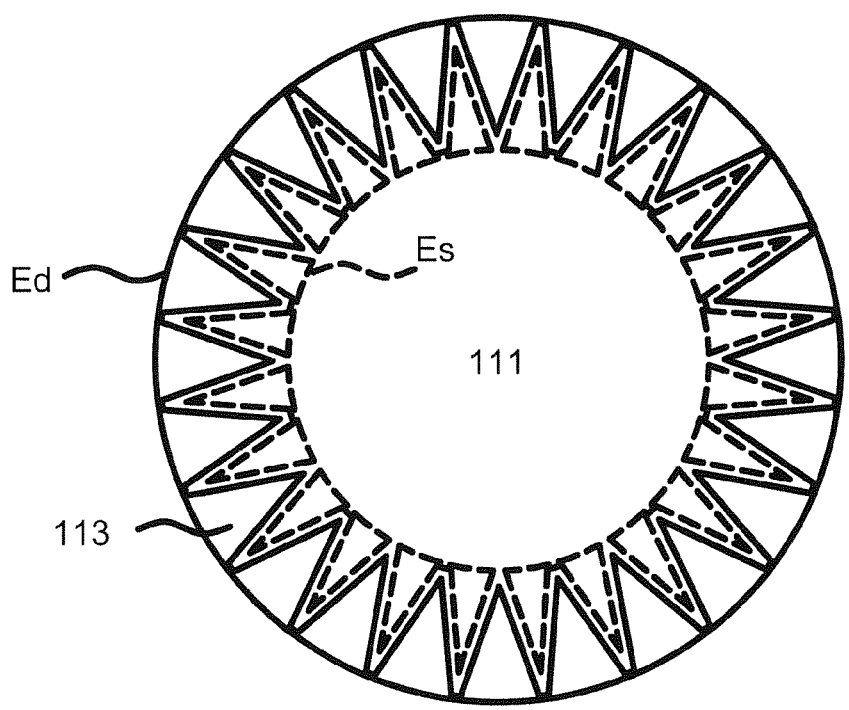
FIG. 4 is a schematic diagram of the arrangement of a ground region and a capacitance sensing region of a substrate according to one embodiment of the present disclosure.

The substrate 11 is, for example, a printed circuit board (PCB) or a printed circuit board assembly (PCBA) which has an upper surface on which the elements are arranged. The upper surface of the substrate 11 has a ground region 111 and a capacitance sensing region 113, e.g. FIG. 4 showing an embodiment of the arrangement of the ground region 111 and the capacitance sensing region 113 of a substrate 11. It should be mentioned that ranges and scales of the ground region 111 and the capacitance sensing region 113 shown in FIG. 4 are intended to illustrate but not to limit the present disclosure. The ground region 111 is connected to the system ground.

In one embodiment, in the capacitance sensing region 113 there is included at least one drive electrode (e.g. Ed shown in FIG. 4) and at least one sensing electrode (e.g. Es shown in FIG. 4) for forming the mutual capacitance therebetween. Accordingly, when a conductor (e.g. the cone 191 or the lateral surface 191S of the cone 191 herein) approaches the capacitance sensing region 113, the mutual capacitance is affected such that a detected signal, e.g. a voltage variation signal or current variation signal, is generated. The principle of a mutual-capacitive sensing device sensing an approaching conductor is known to the art and thus details thereof are not described therein.

In another embodiment, in the capacitance sensing region 113 there is included at least one sensing electrode configured to form the self capacitance with respect to the system ground. Accordingly, when the cone 191 (e.g. a conductor or at least the lateral surface 191S thereof being a conductor) approaches the capacitance sensing region 113, the self capacitance is affected such that a detected signal, e.g. a voltage variation signal or current variation signal, is generated. The principle of a self-capacitive sensing device sensing an approaching conductor is known to the art and thus details thereof are not described therein.

In an alternative embodiment, in the capacitance sensing region 113 there is included at least one sensing electrode, and in the cone 191 there is included at least one drive electrode corresponding to the at least one sensing electrode, wherein the at least one sensing electrode and the at least one drive electrode may be arranged inversely. Therefore, when the cone 191 approaches the capacitance sensing region 113, a distance between electrodes is affected to accordingly change the capacitance therebetween such that a detected signal, e.g. a voltage variation signal or current variation signal, is generated. In this embodiment, the cone 191 may not be a conductor, but the at least one sensing electrode or the at least one drive electrode is disposed therein.

The fixed plate 13 is made of suitable conductive or non-conductive materials, e.g. the plastic material, glass material or metal material, without particular limitations. The fixed plate 13 is separated from the substrate 11 by a fixed distance. In one embodiment, the fixed distance between the fixed plate 13 and the substrate 11 is maintained by a plurality of fixed levers 18, wherein the fixed levers 18 are fastened to the substrate 11 and the fixed plate 13 in a suitable way, e.g. using screws and nuts, but not limited thereto. In other embodiments, the fixed levers 18 may be fastened by adhesive, plug-in, soldering or inserting without particular limitations. The fixed levers 18 are preferably arranged symmetrically and distanced from a center of the fixed plate 13 by a predetermined distance. Preferably, the fixed levers 18 are symmetrically arranged close to an edge of the fixed plate 13 so as to keep balance. In one embodiment, if the fixed plate 13 has a rectangular shape, the fixed levers 18 are arranged at four corners, but not limited thereto. The arrangement of the fixed levers 18 does not have particular limitations as long as a relative distance is stably maintained between the substrate 11 and the fixed plate 13. In addition, the fixed plate 13 has a first opening 131 through which the operation stick 192 can pass. In one embodiment, the first opening 131 locates at a center of the fixed plate 13, but not limited thereto. In some embodiments, according to the combination method between the fixed levers 18 and the fixed plate 13, the fixed plate 13 may further include a plurality of positioning holes through which the fixed levers 18 can pass.

The movable member 15 is made of suitable non-conductive or conductive materials, e.g. the plastic material, glass material or metal material, without particular limitations. The movable member 15 is arranged between the fixed plate 13 and the substrate 11 such that the elastic elements and the cone 191 respectively press against two opposite surfaces thereof so as to form a medium for the force restoring (illustrated hereinafter by examples). In one embodiment, a shape of the movable member 15 is substantially corresponding to that of the fixed plate 13, but not limited thereto. In other embodiments, the movable member 15 may have a suitable shape as long as a part thereof is pressed against by the elastic elements 171, 172 and another part thereof is pressed against by the cone 191. In one embodiment, the movable member 15 has a plurality of positioning holes through which the fixed levers 18, which are configured to maintain the relative distance between the substrate 11 and the fixed plate 13, can movably pass, wherein the fixed levers 18 are to keep relative positions between the movable member 15 and the fixed plate 13 when the operation stick 192 is pressed by an external force. In addition, the movable member 15 has a second opening 151 through which the operation stick 192 can pass. In one embodiment, the second opening 151 locates at a center of the movable member 15, but not limited thereto. The second opening 151 of the movable member 15 may locate at a suitable location as long as it is opposite to the first opening 131 of the fixed plate 13.

Figure 5:
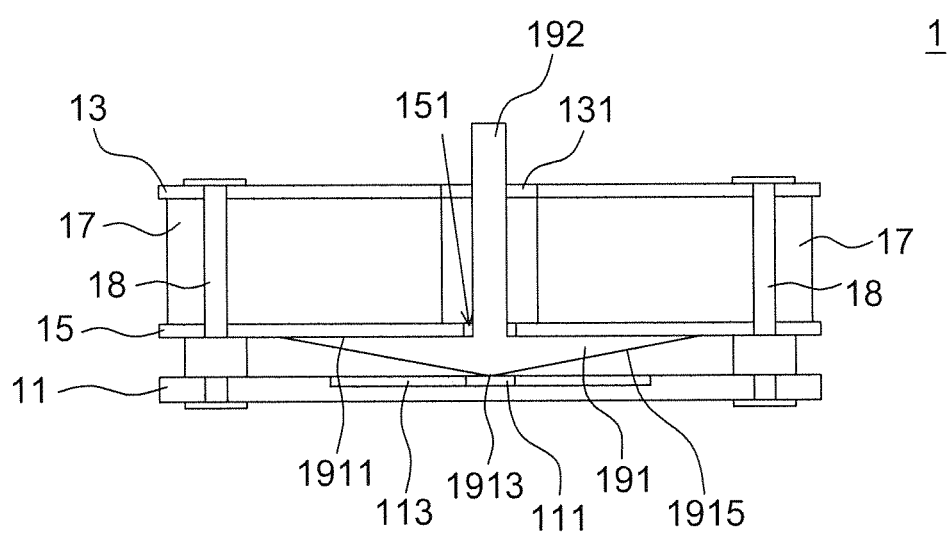
FIG. 5 is a cross-sectional view of a capacitive joystick device according to an alternative embodiment of the present disclosure.

The elastic elements 171 and 172 are symmetrically arranged between the fixed plate 13 and the movable member 15. In one embodiment, the elastic elements 171 and 172 are implemented by springs which press against both the fixed plate 13 and the movable member 15, but not limited thereto. The elastic elements 171 and 172 may be other elastomers, e.g. the rubber. In one embodiment, for fixing positions of the elastic elements 171 and 172, the fixed levers 18 for keeping the relative distance between the substrate 11 and the fixed plate 13 may movably pass through the elastic elements 171 and 172 (e.g. disposed therein) such that a lateral movement does not occur when the elastic elements 171 and 172 are pressed. In other embodiments, two ends of the elastic elements 171 and 172 are fastened to the fixed plate 13 and the movable member 15 respectively as long as a lateral movement does not occur during operation. In addition, a number and disposed positions of the elastic elements 171 and 172 are determined according to shapes of the fixed plate 13 and the movable member 15. For example, when both the fixed plate 13 and the movable member 15 have a rectangular shape, a plurality of elastic elements is arranged at four corners of the rectangular shape, but not limited thereto. In the present disclosure, as the elastic elements are for providing the restoring force, the elastic elements may be replaced by a whole elastic material arranged between the fixed plate 13 and the movable member 15 (e.g. the elastic material 17 shown in FIG. 5) and it is not limited to arranging a plurality of elastic elements, wherein the elastic material also has an opening through which the operation stick 192 can pass. In other embodiments, the elastic elements may be arranged at a side opposite to the operation stick 192 on the fixed plate 13 or at a side opposite to the fixed plate 13 on the operation stick 192 (i.e. arranged inside of the first opening 131 laterally) without particular limitations as long as a restoring force is provided when the operation stick 192 is pressed.

The cone 191 is disposed between the movable member 15 and the substrate 11, and configured as the element for generating the capacitance sensing mechanism and supporting the operation stick 192. The cone 191 includes a base 1911, a vertex 1913 and a lateral surface 1915. At least a part of the base 1911 is arranged to press against a surface of the movable member 15. The vertex 1913 is disposed at the ground region 111 of the substrate 11 to be served as a supporting pivot. As the cone 191 is made of conductive material, the cone 191 is also electrically connected to the system ground via the vertex 1913. At least a part of the lateral surface 1915 is aligned with the capacitance sensing region 113 of the substrate 11 and the lateral surface 1915 forms an included angle with respect to the capacitance sensing region 113. When the operation stick 192 is not pressed by an external force, the included angle is kept identical around the vertex 1913. Accordingly, due to a shape of the cone 191, the central portion of the lateral surface 1915 is closer to the capacitance sensing region 113 and the edge portion of the lateral surface 1915 is farther from the capacitance sensing region 113. It should be mentioned that although the base 1911 is shown as a plane in FIG. 1 to evenly press against a surface of the movable member 15 under an original state, the present disclosure is not limited thereto. In other embodiments, the base 1911 may be a curved surface or have the protrusion(s) as long as the movable member 15 is pushed thereby when the operation stick 192 receives an external force.

In other embodiments, the base 1911 and the lateral surface 1915 of the cone 191 are arranged as non-continuous surfaces. For example, a plurality of extending structures extends outward from a central portion of the cone 191 and the extending structures are arranged corresponding to the electrodes of the capacitance sensing region 113.

The operation stick 192 extends out from the base 1911 of the cone 191, e.g. extending out vertically, and sequentially passes through the second opening 151 and the first opening 131. The part of the operation stick 192 higher than the fixed plate 13 is configured as an operation end for being pushed by a user. In one embodiment, the operation stick 192 and the cone 191 are formed integrally such that the operation stick 192 is also made of conductive material. In another embodiment, the operation stick 192 and the cone 191 are manufactured separately and then combined together, e.g. by securing or plug-in, without particular limitations as long as the operation stick 192 can be fastened to the cone 191. In other words, in this embodiment the operation stick 192 may made of conductive or non-conductive materials without particular limitations. It is appreciated that diameters of the first opening 131 and the second opening 151 are preferably larger than that of a cross section of the operation stick 192 such that the operation stick 192 is movable laterally, wherein sizes of the first opening 131 and the second opening 151 are determined according to the included angle between the substrate 10 and the lateral surface 1915 of the cone 192 (or according to the tilted angle of the lateral surface 1915). In one embodiment, the operation stick 192 may be arranged to be thicker close to the cone 191 and to have a thinner operation end far from the cone 191. The first opening 131 and the second opening 151 may have different diameters.

Figure 2:
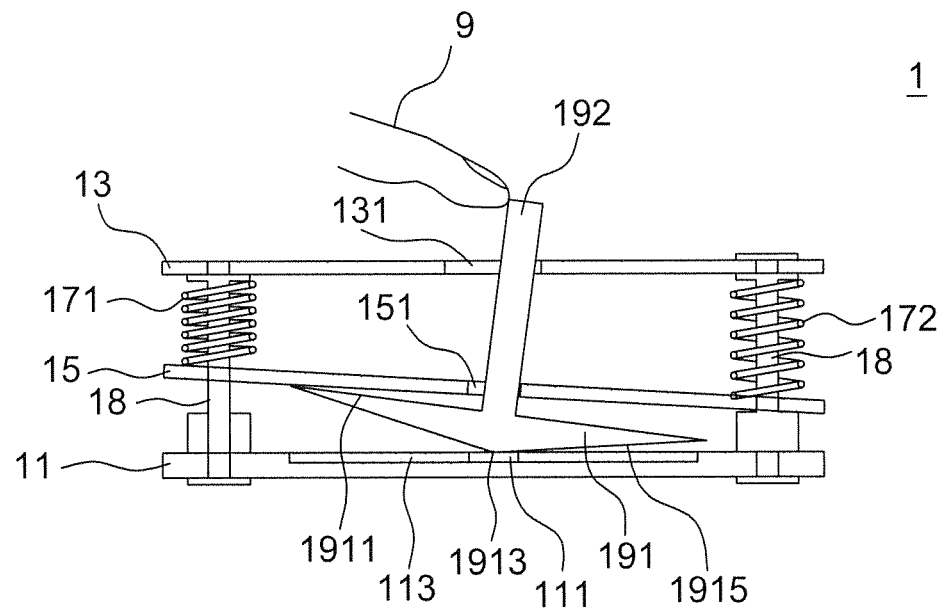
FIG. 2 is a schematic diagram of the operation of a capacitive joystick device according to one embodiment of the present disclosure.
Figure 3:
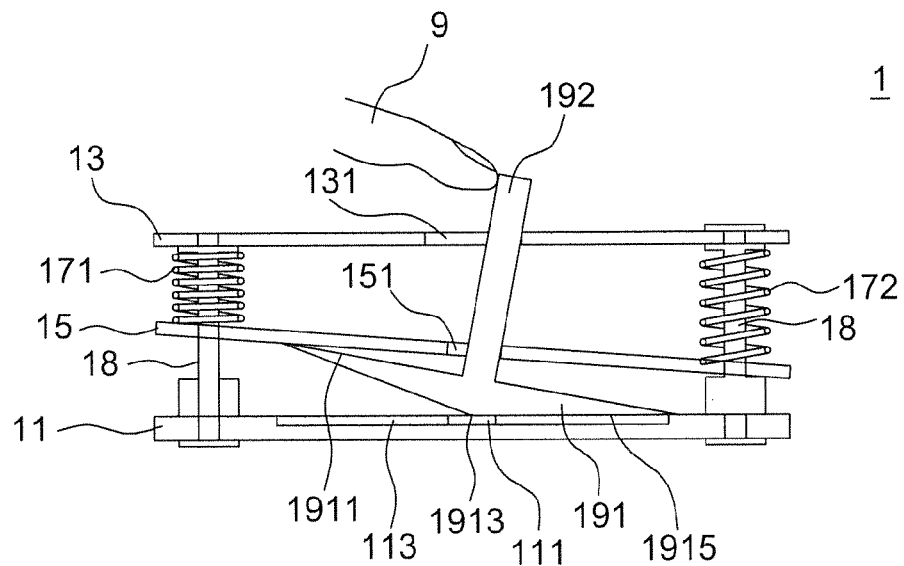
FIG. 3 is another schematic diagram of the operation of a capacitive joystick device according to one embodiment of the present disclosure.

Referring to FIGS. 2 and 3, they are schematic diagrams of the operation of the capacitive joystick device 1. When a finger 9 provides an external force to an operation end of the operation stick 192, e.g. FIG. 2 showing a finger 9 pushing the operation end of the operation stick 192 toward a right direction, the operation stick 192 and the cone 191 incline rightward taking the vertex 1913 of the cone 191 as a pivot. Meanwhile, the base 1911 of the cone 191 (e.g. left part in the figure) pushes the movable member 151 upward to compress the elastic element 171 and stretch the elastic element 172 (herein two ends of the elastic elements respectively fastened to the fixed plate 13 and the movable member 15) such that the elastic elements 171 and 172 simultaneously provide a restoring force to the base 1911 of the cone 191. Meanwhile, the lateral surface 1915 of the cone 191 (e.g. right part in the figure) approaches the capacitance sensing region 113 and a capacitance variation signal is generated, which is sent to a processing unit (not shown) coupled to the substrate 11.

When the capacitance variation signal is larger than a predetermined threshold, the processing unit starts to generate a control signal, e.g. a cursor movement signal to correspondingly control a cursor motion, wherein the control signal may also be other control parameters and is not limited to the cursor displacement. A value of the predetermined threshold determines a sensitivity of the capacitive joystick device 1. When the predetermined threshold is set lower, the control signal is generated when a user pushes the operation stick 192 for a smaller angle; on the contrary, when the predetermined threshold is set higher, the operation stick 192 has to be pushed torn larger angle in order to generate the control signal.

When the finger 9 further pushes the operation end of the operation stick 192 till the lateral surface 1915 is substantially in contact with the capacitance sensing region 113 (e.g. in contact with a dielectric layer or a passivation layer upon the capacitance sensing region 113) as shown in FIG. 3, the largest capacitance variation is generated. When the external force from the finger 9 is removed, the restoring force from the elastic elements 171 and 172 to the movable member 15 recovers the cone 191 and the operation stick 192 back to a balanced position. Accordingly, different capacitance variations are generated under different external forces to correspond to different outputted values. In addition, different pushing directions make the sensing electrode (e.g. Es in FIG. 4) at different positions output the capacitance variation signal so as to determine a direction of the outputted value.

It should be mentioned that the elastic element 171 is pressed and the elastic element 172 is stretched at the same time as mentioned above, but the present disclosure is not limited thereto. According to the arrangement of the elastic elements, for example when one ends of the elastic elements 171 and 172 are not fastened to the movable member 15, pushing the operation stick 192 only presses a part of the elastic elements but does not stretch other elastic elements.

Figure 6A:
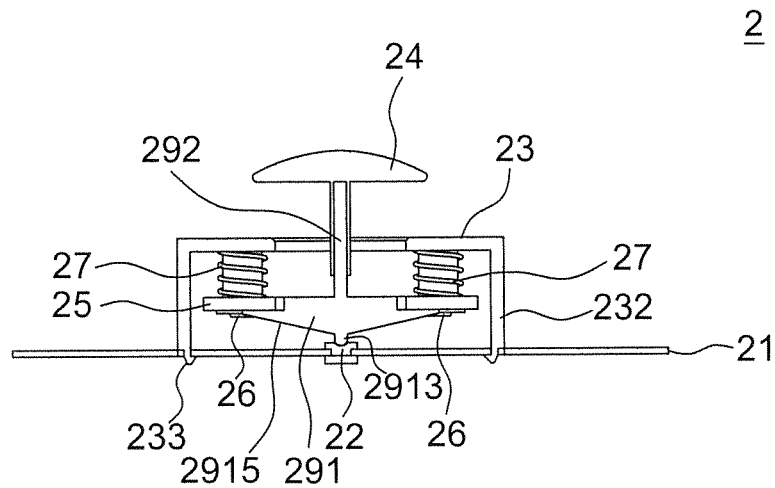
FIG. 6A is a cross-sectional view of a capacitive joystick device according to an alternative embodiment of the present disclosure.
Figure 6B:
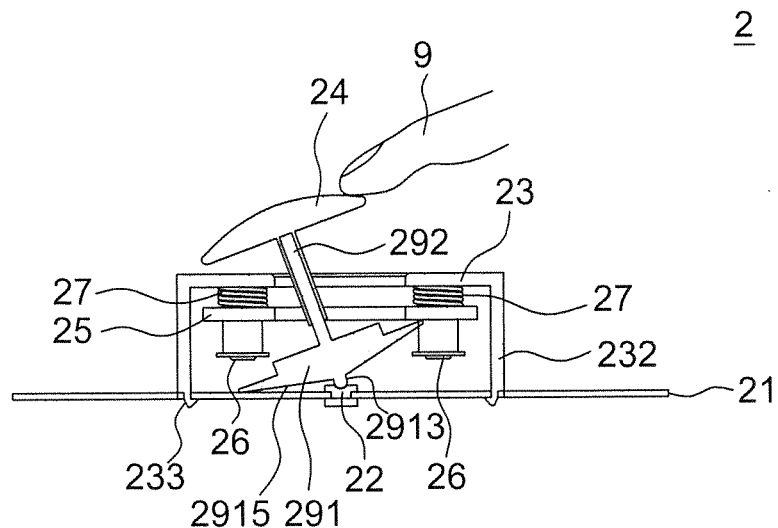
FIG. 6B is a schematic diagram of the operation of the capacitive joystick device of FIG. 6A.
Figure 7:
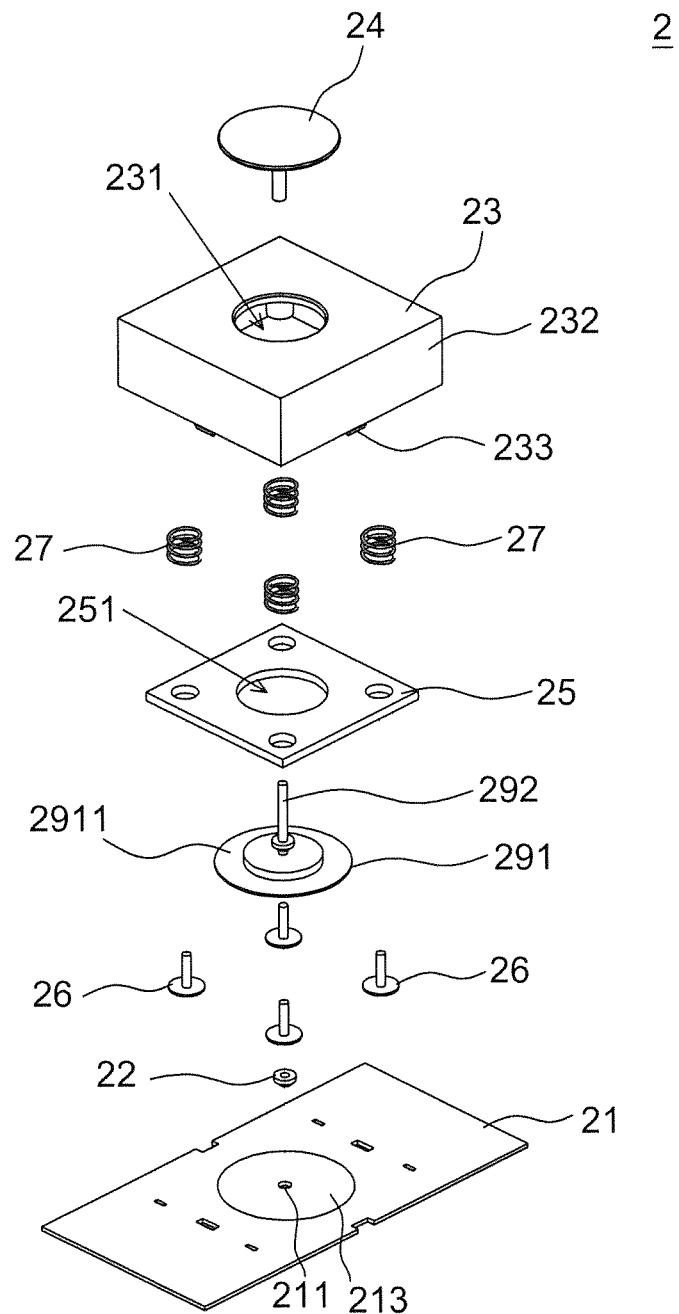
FIG. 7 is an exploded view of the capacitive joystick device of FIG. 6A.

Referring to FIGS. 6A-6B and 7, FIG. 6A is a cross-sectional view of a capacitive joystick device 2 according to an alternative embodiment of the present disclosure; FIG. 6B is an operational schematic diagram of FIG. 6A; and FIG. 7 is an exploded view of FIG. 6A. The capacitive joystick device 2 includes a substrate 21, a fixed plate 23, a movable member 25, a plurality of elastic elements (e.g. FIG. 7 showing four elastic elements 27, but an actual number is not limited thereto), a cone 291 and an operation stick 292, wherein said fixed plate 23 is non-movable with respect to the substrate 21 and said movable member 25 is movable with respect to the substrate 21.

In this embodiment, the substrate 21 also includes a ground region 211 and a capacitance sensing region 213, e.g. as FIG. 4, wherein the ground region 211 is connected to the system ground voltage. The substrate 11 is also a PCB or a PCBA. In another embodiment, the capacitive joystick device 2 further includes a supporting member 22 disposed at the ground region 211 or directly configured as the ground region 211. The supporting member 22 is configured as a pivot for supporting the cone 291. The supporting member 22 may be combined with the substrate 21 in a suitable way, e.g. using adhesive, plug-in, soldering or inserting without particular limitations as long as the supporting member 22 is combined with the substrate 21 stably.

The fixed plate 23 is made of suitable conductive or non-conductive materials, e.g. the plastic material, glass material or metal material, without particular limitations. The fixed plate 23 has a side wall 232 extending toward the substrate 21 to form an inner space in which the movable member 25, the elastic elements 27 and the cone 291 are accommodated. In this embodiment, the side wall 232 of the fixed plate 23 is combined with the substrate 21 and configured to maintain a relative distance between the substrate 21 and the fixed plate 23, wherein the side wall 232 may be combined with the substrate 21 in a suitable way, e.g. using adhesive, plug-in, soldering or inserting without particular limitations. For example, FIG. 7 shows that the side wall 232 includes a plurality of latches 233 for inserting into a plurality of inserting holes on the substrate 21. The fixed plate 23 also includes a first opening 231 through which the operation stick 292 can pass.

The movable member 25 is made of suitable non-conductive or conductive materials, e.g. the plastic material, glass material or metal material, without particular limitations. The movable member 25 is disposed between the fixed plate 23 and the substrate 21, and two opposite surfaces of the movable member 25 are respectively pressed against by the elastic elements 27 and the cone 291 thereby forming a medium for the force restoring. In one embodiment, the movable member 25 has a plurality of positioning holes for a plurality of fastening members 26 to secure the movable member 25 relative to the fixed plate 23. The movable member 25 is separated from the fixed plate 23 by a predetermined distance such that the elastic elements 27 are arranged within the predetermined distance. In this embodiment, the fastening members 26 are, for example, screws configured to movably pass through the elastic elements 27 so as to keep the elastic elements 27 between the fixed plate 23 and the movable member 25, but not limited thereto. The fastening members 26 may also be implemented by the plurality of fixing levers shown in FIG. 1 with one ends thereof fastening to the fixed plate 23 and the other ends thereof configured to maintain a predetermined distance between the movable member 25 and the fixed plate 23. The movable member 25 also includes a second opening 251 through which the operation stick 292 can pass.

Similarly, in this embodiment the elastic elements 27 are symmetrically arranged between the fixed plate 23 and the movable member 25, and configured to provide a restoring force when the operation stick 292 receives an external force. It should be mentioned that although FIG. 7 shows that the elastic elements 27 are springs, the present disclosure is not limited thereto. In other embodiments, the elastic elements 27 are other elastomers, e.g. the rubber.

In addition, for improving the user experience, the capacitive joystick device 2 further includes a handle cap 24 combined with an operation end of the operation stick 292, e.g. the handle cap 24 having a dome structure, wherein the handle cap 24 may be integrated with the operation stick 292 or attached to the operation stick 292 using adhesive, plug-in, soldering or inserting without particular limitations. It should be mentioned that according to different applications the handle cap 24 may not be implemented.

The cone 291 is arranged between the movable member 25 and the substrate 21, and is configured as the device for generating the capacitance sensing mechanism and supporting the operation stick 292. The cone 291 includes a base 2911, a vertex 2913 and a lateral surface 2915. At least a part of the base 2911 is arranged to press against a surface of the movable member 25. The vertex 2913 may be directly disposed at the ground region 211 of the substrate 21 to be configured as a supporting pivot as shown in FIGS. 1-3. In one embodiment, the vertex 2913 of the cone 291 includes a spherical protrusion to be served as a pivot, and the supporting member 22 includes a circular slot for accommodating the spherical protrusion of the vertex 2913 of the cone 291 to allow the cone 291 to swing with respect to the substrate 21 easily.

The operation stick 292 extends out from the base 2911 of the cone 291, e.g. extending out vertically, and sequentially passes through the second opening 251 and the first opening 231. The part of the operation stick 292 higher than the fixed plate 23 is for being pushed by a user and configured as an operation end or for being combined with the handle cap 24. As mentioned above, the operation stick 292 is combined with the base 2911 of the cone 291 in a suitable way. The arrangement of the operation stick 292 is similar to FIGS. 1-3 and thus is not repeated herein.

Referring FIG. 6B, similarly when a finger 9 provides an external force to push the operation end of the operation stick 292, the movable member 25 receives the pushing force from the base 2911 of the cone 291 so as to press the elastic elements 27. When the external force is removed, the elastic elements 27 provides a restoring force to the base 2911 of the cone 291 via the movable member 25 to allow the cone 291 to recover to a balanced state. The difference between this embodiment and FIGS. 1-3 is that in this embodiment the fixed plate 23 is an upper surface of a cover body, and the side wall 232 is used to maintain a relative distance from the substrate 21. An inner space of the cover body is configured to accommodate the movable member 25, the elastic elements 27 and the cone 291. In the embodiment of FIGS. 1-3, the fixed plate 13 is separated from the substrate 11 by a relative distance using a plurality of fixed levers 18.

Figure 8A:
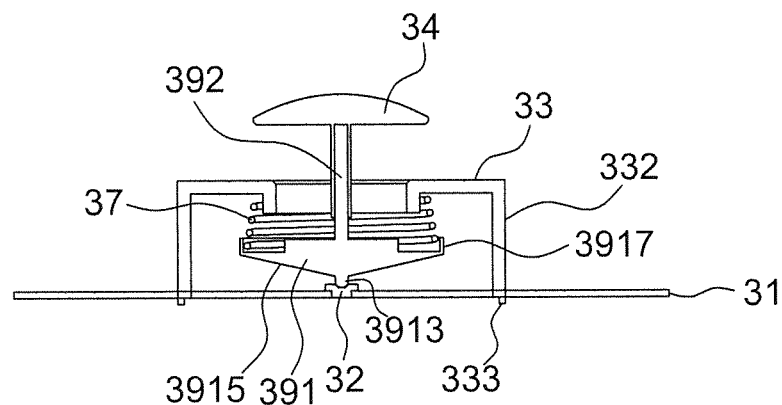
FIG. 8A is across-sectional view of a capacitive joystick device according to an alternative embodiment of the present disclosure.
Figure 8B:
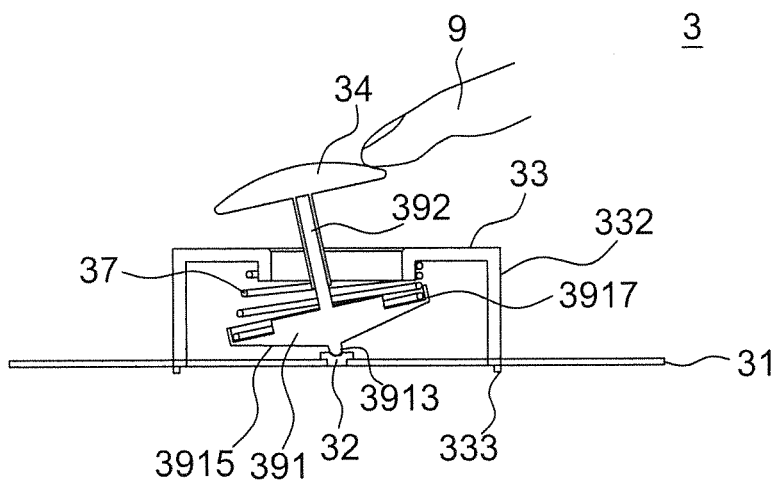
FIG. 8B is a schematic diagram of the operation of the capacitive joystick device of FIG. 8A.
Figure 9:
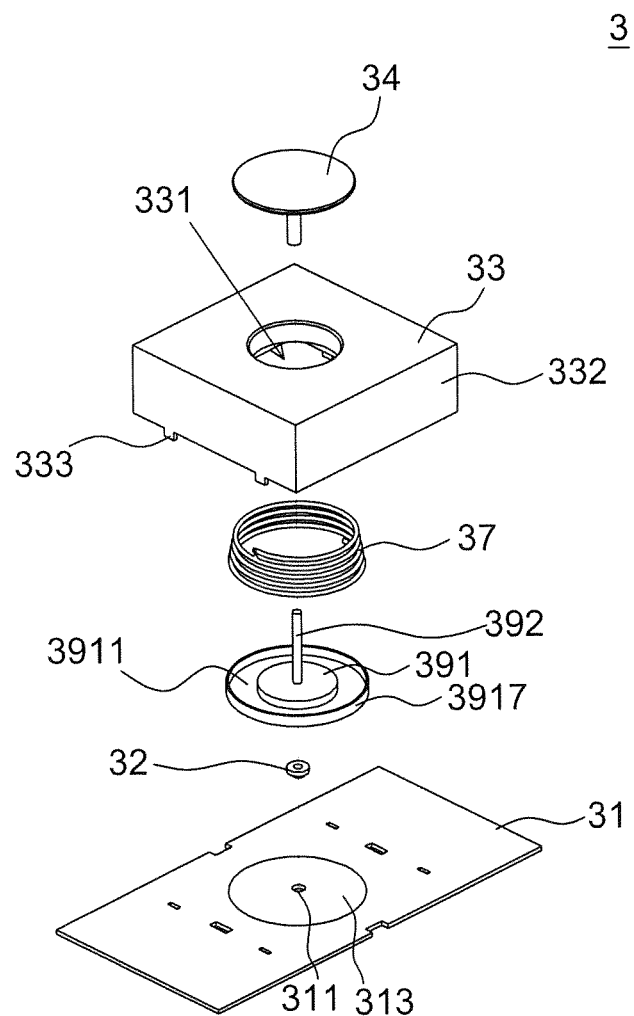
FIG. 9 is an exploded view of the capacitive joystick device of FIG. 8A.

Referring to FIGS. 8A-8B and 9, FIG. 8A is a cross-sectional view of a capacitive joystick device 3 according to an alternative embodiment of the present disclosure; FIG. 8B is an operational schematic diagram of FIG. 8A; and FIG. 9 is an exploded view of FIG. 8A. The capacitive joystick device 3 includes a substrate 31, a fixed plate 33, an elastic element 37, a cone 391 and an operation stick 392, wherein said fixed plate 33 is separated from the substrate 31 by a fixed relative distance.

In this embodiment, the substrate 31 also includes a ground region 311 and a capacitance sensing region 313, e.g. as FIG. 4, wherein the ground region 311 is connected to the system ground voltage. In another embodiment, the capacitive joystick device 3 may further include a supporting member 32 disposed at the ground region 311 or directly configured as the ground region 311. The supporting member 32 is configured as a pivot for supporting the cone 391. The supporting member 32 may be combined with the substrate 31 in a suitable way, e.g. using adhesive, plug-in, soldering or inserting, without particular limitations.

The fixed plate 33 is made of suitable conductive or non-conductive materials, e.g. the plastic material, glass material or metal material. The fixed plate 33 has a side wall 332 extending toward the substrate 31 to form an inner space in which the elastic element 37 and the cone 391 are accommodated. In this embodiment, the side wall 332 of the fixed plate 33 is combined with the substrate 31 and configured to maintain a relative distance between the substrate 31 and the fixed plate 33, wherein the side wall 332 may be combined with the substrate 31 in a suitable way, e.g. using adhesive, plug-in, soldering or inserting, without particular limitations. For example, FIG. 9 shows that the side wall 332 includes a plurality of latches 333 for inserting into a plurality of inserting holes on the substrate 31 and then fixed by soldering. The fixed plate 33 also includes a first opening 331 through which the operation stick 392 can pass.

Similarly, for improving the user experience, the capacitive joystick device 3 further includes a handle cap 34 combined with an operation end of the operation stick 392, e.g. the handle cap 34 having a dome structure, wherein the handle cap 34 may be integrated with the operation stick 392 or attached to the operation stick 392 using adhesive, plug-in, soldering or inserting, without particular limitations. It should be mentioned that according to different applications the handle cap 34 may not be implemented.

The cone 391 is configured as the device for generating the capacitance sensing mechanism and supporting the operation stick 392. The cone 391 includes a base 3911, a vertex 3913 and a lateral surface 3915. The vertex 3913 may be directly disposed at the ground region 311 of the substrate 31 to be configured as a supporting pivot as shown in FIGS. 1-3. In one embodiment, the vertex 3913 of the cone 391 includes a spherical protrusion to be served as a pivot, and the supporting member 32 includes a circular slot for accommodating the spherical protrusion of the vertex 3319 of the cone 391 to allow the cone 391 to swing with respect to the substrate 31 easily.

The operation stick 392 extends out from the base 3911 of the cone 391, e.g. extending out vertically, and movably passes through the elastic element 37 and the first opening 331 of the fixed plate 33. The part of the operation stick 392 higher than the fixed plate 33 is for being pushed by a user and configured as an operation end or for being combined with the handle cap 34. As mentioned above, the operation stick 392 is combined with the base 3911 of the cone 391 in a suitable way. The arrangement of the operation stick 392 is similar to FIGS. 1-3 and thus is not repeated herein.

In this embodiment, the elastic element 37 is arranged between the fixed plate 33 and the base 3911 of the cone 391, and configured to provide a restoring force when the operation stick 392 is pressed by an external force. It should be mentioned that although FIG. 9 shows that the elastic element 37 is a spring, the present disclosure is not limited thereto. In other embodiments, the elastic element 37 is another elastomer, e.g. the rubber.

In addition, in order to constrain the lateral position of the elastic element 37, at least one positioning protrusion 3917 is further formed on the base 3911 of the cone 391, and the elastic element 37 is arranged inside of the positioning protrusion 3917. For example in one embodiment, the positioning protrusion 3917 is formed at an edge of the base 3911 of the cone 391 in a ring shape so as to form a ring wall. In other embodiments, a plurality of positioning protrusions 3917 is symmetrically formed close to the edge of the base 3911 and the object of constraining the lateral position of the elastic element 37 is also achievable.

Referring to FIG. 8B, similarly when a finger 9 provides an external force to push the operation stick 392, the base 3911 of the cone 391 directly presses against the elastic element 37. When the external force is removed, the elastic element 37 directly provides a restoring force to the base 3911 of the cone 391 to allow the cone 391 to recover to a balanced state. The difference between this embodiment and FIGS. 6A-6B is that in this embodiment only one elastic element 37 is included and directly arranged between the fixed plate 33 and the base 3911 of the cone 391. In the embodiment of FIGS. 6A-6B, a plurality of elastic elements 27 indirectly provides a restoring force to the base 2911 of the cone 291 via a movable member 25.

Figure 10:
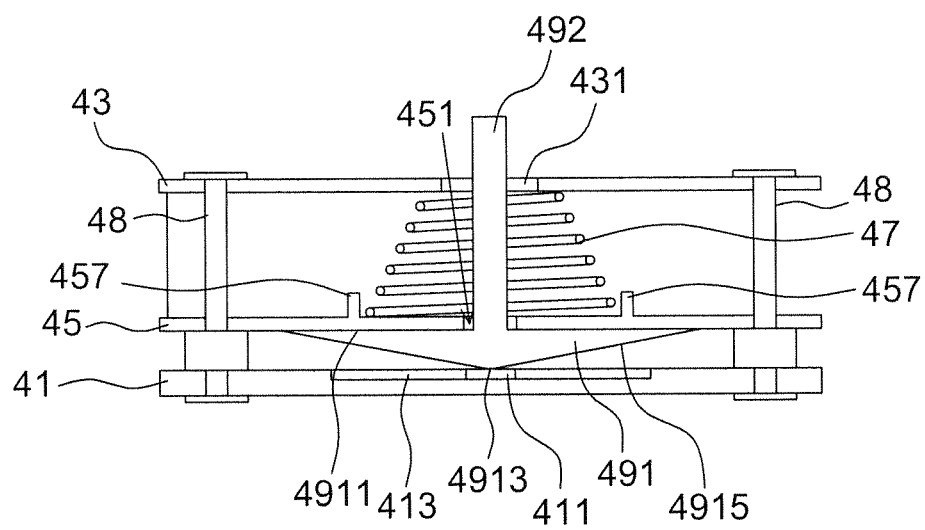
FIG. 10 is a cross-sectional view of a capacitive joystick device according to an alternative embodiment of the present disclosure.

Referring to FIG. 10, it is a cross-sectional view of a capacitive joystick device 4 according to an alternative embodiment of the present disclosure. The difference between this embodiment and FIGS. 1-3 is that in this embodiment only one elastic element 47 is included and presses against the fixed plate 43 and the movable member 45, and the operation stick 492 movably passes through the elastic element 47; whereas, in FIGS. 1-3 a plurality of elastic elements is arranged to press against the fixed plate 43 and the movable member 45. In addition, for fixing a lateral position of the elastic element 47, at least one positioning protrusion 457 is further formed on the movable member 45, and the elastic element 47 is arranged inside of the positioning protrusion 457. The positioning protrusion 457 may also be formed as a ring wall or a plurality of symmetrically positioned protrusions without particular limitations. Other parts of this embodiment are similar to FIGS. 1-3 and thus are not repeated herein.

It should be mentioned that although FIG. 10 shows that a plurality of fixed levers 48 is configured to maintain the relative distance between the substrate 41 and the fixed plate 43, as well as the movable member 45 includes a plurality of positioning holes for the fixed levers 48 movably passing through and is disposed between the elastic element 47 and the base 4911 of the cone 491, the present disclosure is not limited thereto. In other embodiments, the movable member 45 shown in FIG. 10 may not be implemented, and the elastic element 47 is disposed between the fixed plate 43 and the base 4911 of the cone 491 and directly presses against the fixed plate 43 and the base 4911 (as shown in FIGS. 8A-8B). Meanwhile, at least one positioning protrusion is disposed on the base 4911 of the cone 491 configured to constrain a lateral position of the elastic element 47.

It should be mentioned that although FIGS. 2-3 show that a finger 9 directly gives an external force to the operation stick 192, the present disclosure is not limited thereto. In FIGS. 1-3 and 10, the operation stick may also be combined with a handle cap (as shown in FIGS. 6A-6B and 8A-8B) so as to improve the user experience.

It should be mentioned that the arrangement of the at least one elastic element mentioned in the above embodiments is not to limit the present disclosure as long as the at least one elastic element is disposed between the fixed plate and the base of the cone and presses against the fixed plate and the base such that when the operation stick receives an external force, the at least one elastic element may give a restoring force to the base of the cone. For example, the at least one elastic element directly presses against the base of the cone (e.g. as shown in FIGS. 8A-8B) or indirectly presses against the base of the cone via a movable member (e.g. as shown in FIGS. 1-3, 5, 6A-6B and 10).

It should be mentioned that in the above embodiments, the cone is illustrated by a simple cone, but the present disclosure is not limited thereto. For example, in the embodiment of FIGS. 8A and 8b, the central portion of the cone 391 may have an altitude such that one end of the elastic element 37 is accommodated between the altitude and the positioning protrusion 3917 to facilitate the constraining of the lateral position of the elastic element 37. In other words, in the present disclosure the detailed structure of the cone is determined according to the required applications without particular limitations as long as the cone includes a vertex configured as a pivot, a lateral surface configured to change the inductive capacitance of the capacitance sensing region when the cone is tilted, and a base having at least a part configured to press against a movable member or directly press against an elastic element.

In addition, the electrode arrangement in the capacitance sensing regions 213, 313, 413 and the cones 291, 391, 491 is similar to the capacitance sensing region 113 and the cone 191 of the first embodiment and thus details thereof are not repeated herein. Corresponding to the material of the cones 291 and 391, the supporting members 22 and 32 may be conductive or non-conductive materials.

It should be mentioned that in the above embodiments, the operation stick is illustrated by a simple stick, but the present disclosure is not limited thereto. In order to increase the structure strength, the operation stick may be arranged to have a larger diameter close to the cone, or for the attachment of the handle cap the operation stick may be arranged to have a thinner diameter close to the operation end thereof and is not limited to those illustrated in the above embodiments.

As mentioned above, as the conventional mechanical joystick device has a significant height such that it is not suitable to portable devices or wearable devices. Therefore, the present disclosure further provides a capacitive joystick device (FIGS. 1-3, 5, 6A-6B, 8A-8B and 10) that may generate a control signal based on the capacitance sensing mechanism and provide a force feedback via the elastic element(s) such that it has a small size to be adaptable to portable devices or wearable devices.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A capacitive joystick device comprising:
    a substrate comprising a ground region and a capacitance sensing region;
    a fixed plate comprising a first opening;
    a movable member comprising a second opening;
    a plurality of elastic elements disposed between the fixed plate and the movable member to press against the fixed plate and the movable member;
    a cone disposed between the movable member and the substrate, and the cone comprising:
        a base pressing against the movable member;
        a vertex disposed at the ground region of the substrate; and
        a lateral surface aligned with the capacitance sensing region of the substrate;
    an operation stick extending from the base of the cone and passing through the first opening and the second opening; and
    a plurality of fixed levers configured to maintain a relative distance between the substrate and the fixed plate.

2. The capacitive joystick device as claimed in claim 1, wherein the fixed plate and the movable member have a rectangular shape, and the elastic elements are disposed at four corners of the rectangular shape, respectively.

3. The capacitive joystick device as claimed in claim 1, further comprising a handle cap combined with an operation end of the operation stick.

4. The capacitive joystick device as claimed in claim 1, wherein the fixed plate comprises a side wall extending toward the substrate to form an inner space which accommodates the movable member, the elastic elements and the cone.

5. The capacitive joystick device as claimed in claim 4, wherein the side wall of the fixed plate is combined with the substrate.

6. The capacitive joystick device as claimed in claim 1, further comprising a supporting member disposed at the ground region of the substrate, wherein the vertex of the cone comprises a spherical protrusion configured as a pivot, and the supporting member comprises a circular slot configured to accommodate the spherical protrusion of the vertex of the cone.

7. The capacitive joystick device as claimed in claim 1, further comprising a plurality of fastening members movably passing through the elastic elements and configured to fasten the elastic elements between the fixed plate and the movable member.

8. A capacitive joystick device comprising:
    a substrate comprising a ground region and a capacitance sensing region;
    a fixed plate comprising a first opening and separated from the substrate by a relative distance;
    a cone comprising:
        a base;
        a vertex disposed at the ground region of the substrate; and
        a lateral surface aligned with the capacitance sensing region of the substrate;
    an elastic element disposed between the fixed plate and the base of the cone;
    an operation stick extending from the base of the cone and movable passing through the elastic element and the first opening of the fixed plate;
    a plurality of fixed levers configured to maintain the relative distance between the substrate and the fixed plate; and
    a movable member disposed between the elastic element and the base of the cone, wherein the movable member comprises a plurality of positioning holes through which the fixed levers movably pass.

9. The capacitive joystick device as claimed in claim 8, further comprising a handle cap combined with an operation end of the operation stick.

10. The capacitive joystick device as claimed in claim 8, further comprising a supporting member disposed at the ground region of the substrate, wherein the vertex of the cone comprises a spherical protrusion configured as a pivot, and the supporting member comprises a circular slot configured to accommodate the spherical protrusion of the vertex of the cone.

11. The capacitive joystick device as claimed in claim 8, wherein the fixed plate further comprises a side wall extending toward and combined with the substrate.

12. The capacitive joystick device as claimed in claim 8, wherein at least one positioning protrusion is formed on the movable member, and the elastic element is disposed inside of the positioning protrusion.

13. A capacitive joystick device comprising:
   a substrate comprising a ground region and a capacitance sensing region;
   a fixed plate comprising a first opening and separated from the substrate by a relative distance;
   a cone comprising:
      a base;
      a vertex disposed at the ground region of the substrate; and
      a lateral surface aligned with the capacitance sensing region of the substrate;
   an elastic element disposed between the fixed plate and the base of the cone; and
   an operation stick extending from the base of the cone and movable passing through the elastic element and the first opening of the fixed plate,
   wherein at least one positioning protrusion is formed on the base of the cone, and the elastic element is disposed inside of the positioning protrusion.

14. The capacitive joystick device as claimed in claim 13, wherein the positioning protrusion is formed as a ring at an edge of the base of the cone.

15. A capacitive joystick device comprising:
   a substrate comprising a ground region and a capacitance sensing region;
   a fixed plate comprising a first opening and a side wall, the side wall extending toward and combined with the substrate and configured to maintain a relative distance between the substrate and the fixed plate;
   a cone comprising:
      a base formed with at least one positioning protrusion;
      a vertex disposed at the ground region of the substrate; and
      a lateral surface aligned with the capacitance sensing region of the substrate;
   at least one elastic element disposed between the fixed plate and the base of the cone, and the elastic element being disposed inside of the positioning protrusion; and
   an operation stick extending from the base of the cone and passing through the first opening of the fixed plate,
   wherein the at least one elastic element is configured to provide a restoring force to the base of the cone when the operation stick receives an external force.

16. The capacitive joystick device as claimed in claim 15, wherein the at least one elastic element directly presses against the base of the cone, or indirectly presses against the base of the cone via a movable member.

* * * * *